J. W. LAMB.
Handles for Tea and Coffee Pots.
No. 156,801.  Patented Nov. 10, 1874.
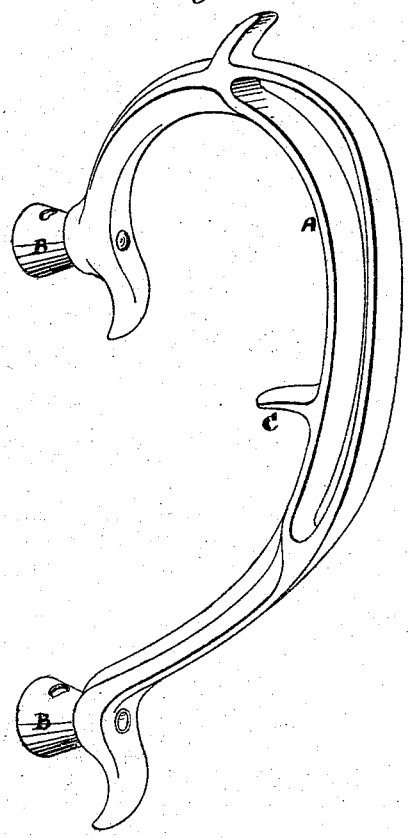
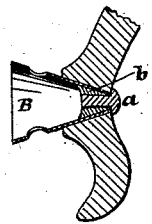 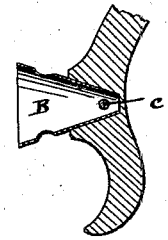
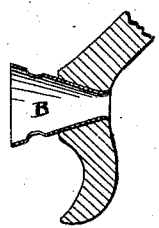 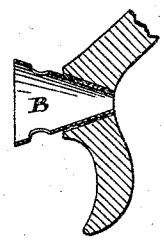
Witnesses.  Inventor.

UNITED STATES PATENT OFFICE.

J. WARREN LAMB, OF WHITESTONE, L. I., NEW YORK.

IMPROVEMENT IN HANDLES FOR TEA AND COFFEE POTS.

Specification forming part of Letters Patent No. 156,801, dated November 10, 1874; application filed October 30, 1874.

*To all whom it may concern:*

Be it known that I, J. WARREN LAMB, of Whitestone, Long Island, in the State of New York, have invented certain new and useful Improvements in Handles for Tea and Coffee Pots, and like articles, of which the following is a specification:

My invention mainly relates to the structure of the handle at the points which are connected to the pot or other vessel.

Owing to the difficulty of effecting the direct union of the body of the handle with the pot, it has been usual heretofore to employ sheet-metal tips, which are united at the one end with the handle, and at the other end with the pot. My invention, in this connection, refers to the union of the tip with the handle. This union has been effected hitherto in one of two ways, either by the employment of a tip having the form of a sleeve, which is fitted on and soldered to the handle, or by using a box-like tip, the bottom or closed end of which is united with the handle by a rivet passing through the bottom of the tip and the contiguous portion of the handle upon which the bottom is fitted. The characteristic feature of my invention, and the one that principally makes the difference between it and the methods above mentioned is, that the tip is let into the handle—that is to say, it passes into or through the handle—whereby I am enabled to securely fasten the tip in a stronger, neater, and more economical manner than has hitherto been practicable. The handle at the points where it has to be attached to the pot is formed with sockets—preferably of conical form—extending wholly or partly through it. Into these sockets are tightly fitted the tips, which may then be secured therein by swaging, riveting, soldering, or any other convenient means.

To enable those skilled in the art to understand and use my invention, I will now proceed to describe it more particularly by reference to the accompanying drawing, in which—

Figure 1 is a perspective view of a handle embodying my improvements. Fig. 2 is a longitudinal central section of the upper tip of the handle in Fig. 1. Fig. 3 is a like section of the lower tip in Fig. 1. Figs. 4 and 5 are like sections of modifications to be hereinafter described.

The handle A, which may have any suitable configuration, is usually made of cast metal. In the ends of the handles, at the point where it is applied to the pot or other vessel, I form sockets, as shown in Figs. 2, 3, 4, and 5, which extend either wholly or partly through the handle. These sockets are preferably of conical form, with their larger ends on the side next to the pot. The tips, shown at B, are of sheet metal, of a shape to snugly fit into the socket. The openings or sockets are made to an exact and uniform size by reaming or other suitable means. The tips are prepared by cutting blanks from flat sheet metal, and then bending these blanks by proper means into a form to fit the sockets. They are then forced into the sockets by a press or other appliance. By thus incorporating the tips into the handle I render available many ways of fastening the tips in place, which could not be used under the old methods, and at the same time in all cases obtain a stronger and neater joint than has hitherto been practicable.

One way of securing the tip—which on many accounts I prefer—is represented in Fig. 3. The conical socket in this case extends entirely through the handle, and at its smaller or outer end is slightly countersunk, so that the opening through the handle is really formed of two truncated cones joining at their smaller ends. The tip is forced into this opening, and while it is held firmly therein its smaller end is reamed, swaged, or spread until it fills tightly the countersunk end of the socket. The tip is thus secured in place without the use of solder, rivets, or other extraneous means.

Another way of securing the tip is, as shown in Fig. 2, by means of a headed pin, *a*, whose shank passes into the interior of the tip through the smaller open end of the conical socket, and is there secured by solder *b*. Still another way of securing the tip is indicated in Fig. 4. The socket in this case extends only partly through the handle, and the tip is secured by means of a lateral or cross-pin, *c*, passing through the handle and the sides of the tip.

A secure fastening can even be effected by solder alone, as indicated in Fig. 5, in which the tip is represented as soldered in the socket.

Other ways of securing the socket-tip can be employed. Those which I have described are sufficient to indicate the advantages of the characteristic feature of my invention, which, as above intimated, mainly consists in seating the tip in a socket extending wholly or partly through the handle.

Upon the inner side of the handle in Fig. 1 will be seen a spur or lug, C, which is the device hereinbefore referred to for enabling the hand to take a firmer hold on the handle. This spur or lug C, when the handle is grasped, will project between the second and third fingers, for instance, and will thus form a bearing which will enable the user to resist the tendency of the handle to slip in the hand, when the pot is lifted.

I prefer to perforate the tip at one or more points, as shown, for the purpose of allowing circulation of air in the tip, and of thus preventing, to some extent, the transmission of heat through the tip to the handle.

To apply the handle to the pot or other vessel, of which it is to form part, the tips are secured to the vessel in any ordinary or suitable way.

Having described my invention, what I claim, and desire to secure by Letters Patent, is—

1. A handle for tea and coffee pots, and like vessels, provided with sheet-metal tips seated in sockets, extending wholly or partly through the handle, as shown and described.

2. The combination with a handle, formed with a conical socket extending through it, and countersunk at its smaller end, of a conical or tapering sheet-metal tip, fitting the said socket, and by being swaged or spread into the countersunk portion of the socket, substantially as shown and described.

In testimony whereof I have hereunto signed my name this 27th day of October, A. D. 1874.

J. WARREN LAMB.

Witnesses:
Z. S. BOUTON,
JAMES W. HILL.